H. B. FOLEY.
SAW SETTING DEVICE.
APPLICATION FILED DEC. 9, 1915.

1,199,977.

Patented Oct. 3, 1916.
2 SHEETS—SHEET 1.

Witnesses
E. C. Skinkle
G. F. Williamson

Inventor
Hugh B. Foley
By his Attorneys

H. B. FOLEY.
SAW SETTING DEVICE.
APPLICATION FILED DEC. 9, 1915.
1,199,977.
Patented Oct. 3, 1916.
2 SHEETS—SHEET 2.
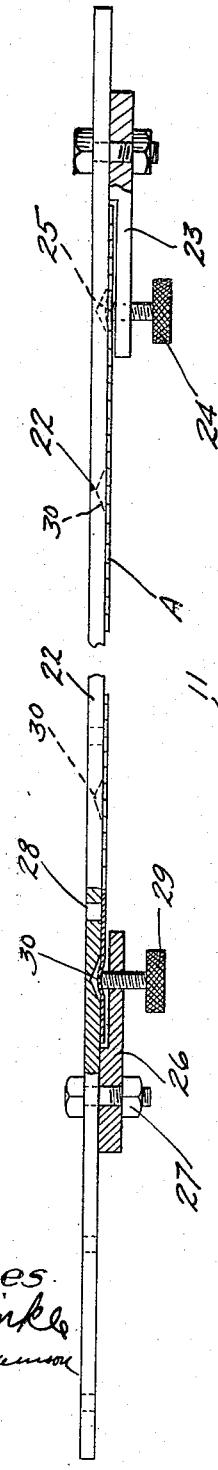
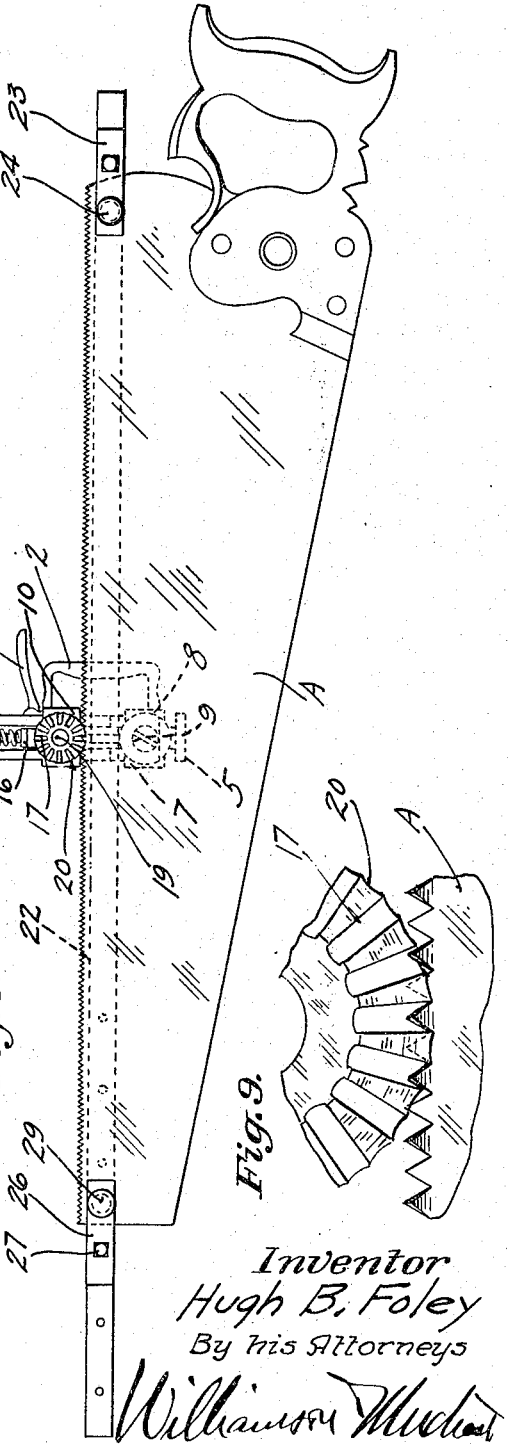
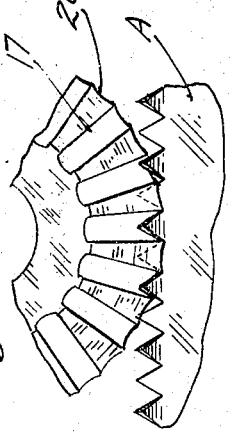
Witnesses
E. C. Skinkle
G. F. Williamson
Inventor
Hugh B. Foley
By his Attorneys
Williamson Merchant

UNITED STATES PATENT OFFICE.

HUGH B. FOLEY, OF MINNEAPOLIS, MINNESOTA.

SAW-SETTING DEVICE.

1,199,977. Specification of Letters Patent. Patented Oct. 3, 1916.

Application filed December 9, 1915. Serial No. 65,884.

*To all whom it may concern:*

Be it known that I, HUGH B. FOLEY, a citizen of the United States, residing at Minneapolis, in the county of Hennepin and State of Minnesota, have invented certain new and useful Improvements in Saw-Setting Devices; and I do hereby declare the following to be a full, clear, and exact description of the invention, such as will enable others skilled in the art to which it appertains to make and use the same.

My invention has for its object to provide an extremely simple and highly efficient saw setting device; and to such ends, generally stated, the invention consists of the novel devices and combinations of devices hereinafter described and defined in the claims.

In a sense, this improved saw setting device is automatic in its action, because when it is drawn over the saw teeth, the tooth-setting action is automatically performed by the rotation of a setting wheel or rotary die having circumferentially spaced tooth engaging surface in reverse conical arrangement staggered and outwardly diverging. This type of setting wheel is not broadly new with this invention, but my invention applies thereto several highly important and novel features, the most important of which is making the said tooth engaging surfaces concave in cross section, so that the saw teeth once properly engaged therewith, will maintain that proper engagement in their regular order under the traveling movement of the saw setting device.

The invention also involves other highly important features whereby the device is adapted to be readily used, both on a saw having its back parallel to its toothed edge and in a saw having a back that is oblique to its toothed edge.

In the accompanying drawings which illustrate the invention, like characters indicate like parts throughout the several views.

Figure 1:
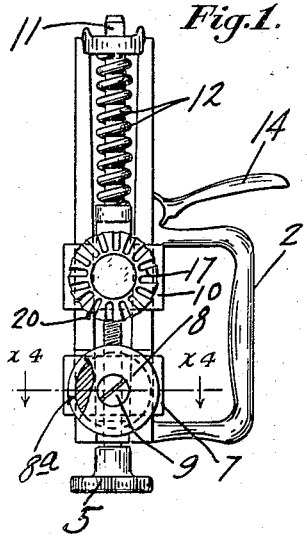
Figure 2:
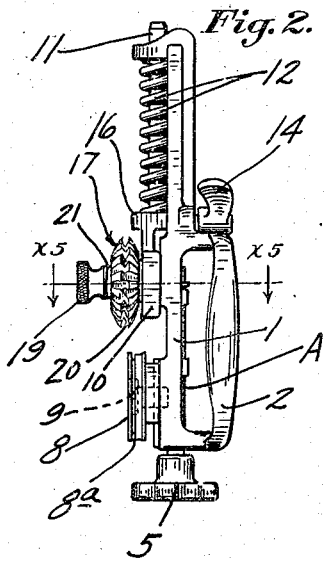
Figure 3:
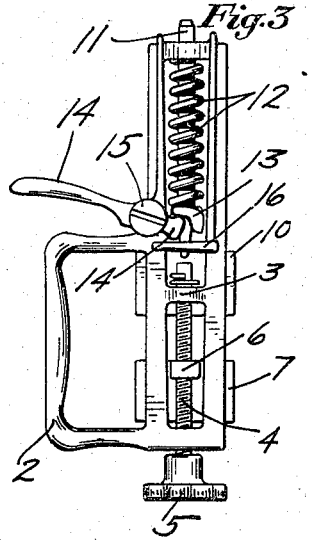
Figure 4:
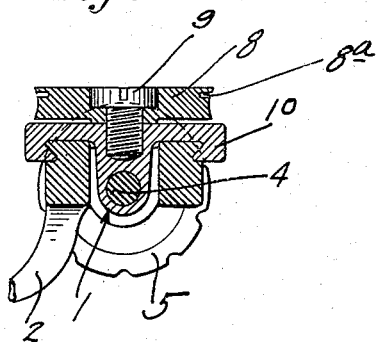
Figure 5:
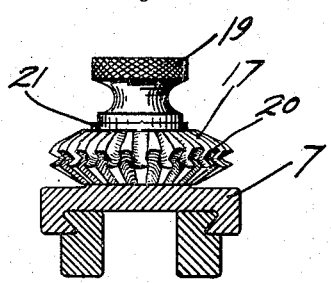
Figure 6:
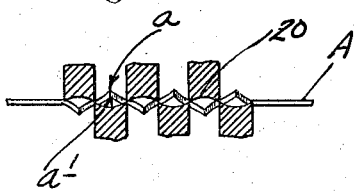

Referring to the drawings: Figure 1 shows the improved saw setting device in left side elevation; Fig. 2 shows the saw setting device in rear elevation; Fig. 3 shows the setting device in right side elevation; Fig. 4 is a horizontal section taken on the line $x^4\ x^4$ of Fig. 1; Fig. 5 is a horizontal section taken on the line $x^5\ x^5$ of Fig. 2; some parts being shown in full; Fig. 6 is a distorted section showing sections of the tooth setting surfaces as if straightened out or assembled on a straight line; Fig. 7 shows a guide for application to a saw having a back that is oblique to its toothed edge; Fig. 8 shows the complete saw-setting device including the saw guide applied to a saw having an oblique back; and Fig. 9 is a fragmentary view in side elevation illustrating the action of the setting wheel on the teeth of the saw.

In Figs. 7, 8 and 9, an ordinary hand saw having an oblique blade is indicated, as an entirety, by the character "A".

Referring now, particularly, to Figs. 1 to 4, inclusive, the numeral 1 indicates a small vertically elongated cast frame having a suitable hand piece 2. The frame 1 is slotted nearly from top to bottom, but at its intermediate portion, has an integral connecting bar or web 3. An adjusting screw 4 is swiveled to the bar 3 and to the lower end of the frame 1, and at its projecting lower end, has a suitable hand piece or stub 5, by means of which it may be readily rotated. This adjusting screw 5 has threaded engagement with a lug 6 of a tool block 7 that is mounted to slide vertically on the lower portion of the frame 1, and to which a peripherally grooved saw guiding wheel 8 is journaled by means of a machine screw or stud 9.

Mounted to slide vertically on the intermediate portion of the frame 1, just above the tool block 7, is another and similar tool block 10, but which has a long upwardly projecting stem 11 working freely through a perforation in the upper end of the said frame. A coiled spring 12 applied around the stem 11 re-acts against the top of the frame 1 and the said block 10 and yieldingly forces the same downward. The said block 10 is provided with a projecting cam lug 13, which, by the spring 12, is kept pressed against the short end of a lifting lever 14 that is pivoted to the frame 1 by means of a machine screw or stud 15. The free outer end of this lever 14 overlies the hand piece 2 where it may be reached by the thumb of the hand that grips the said hand piece. Normally, the short end of of the lever 14 is pressed against a stop flange 16 which, as shown, is cast integral with the frame 1, and indirectly limits the downward movement of the upper tool block 10.

The setting wheel 17 is detachably journaled to the upper tool block 10. The setting wheel 17 is loosely journaled on the trunnion 18, preferably made integral with the upper block 10 and having an internally threaded seat to receive the threaded end of a knurled head 19 which serves to detachably hold the said setting wheel in working position. This setting wheel is formed with two opposing series of circumferentially spaced tooth engaging surfaces 20 that are in reverse conical and intersecting arrangement. Otherwise stated, the circumferentially spaced setting surfaces 20, on the one side, diverge in respect to the alternated opposing setting surfaces 20 on the other side, and the said setting surfaces on the one side are alined on an imaginary cone that intersects a reverse imaginary cone on which the opposing or opposite tooth engaging surfaces are alined. Hitherto, when these tooth engaging surfaces have been made flat or straight in cross section, it is found that the saw teeth would not maintain proper engagement, but would slip out of place, and hence, render the setting device not only inoperative to properly set the saw teeth, but actually destructive in that they would twist the teeth into all sorts of distorted arrangement. However, I have found that by the simple expedient of making these tooth engaging surfaces concave in cross section, the saw teeth will maintain proper engagement with the saw teeth, so that when the setting tool is moved back and forth and the setting wheel is run over the saw teeth, there will be a positive driving action of the setting wheel very much like that produced by a sprocket chain running over a sprocket. In this way, it is only necessary to properly set one of the tooth engaging surfaces of the setting wheel on a saw tooth and to run the setting device back and forth over the saw teeth.

Here it may be noted that on one side, the setting wheel 17 has a hub 21 which, in the application of the wheel shown in Fig. 2, is placed next to the upper tool block 10, so that the channel of the setting wheel is slightly offset from the outer edge of the guide wheel 8. This is a setting desired when the setting device is to be used in connection with a guide bar for setting the teeth of a saw having an oblique back, as in Figs. 7 and 8, for in such use, the blade of the saw comes just outward of the outer face of the said guide wheel, so that a guide bar 22 applied to the saw will then properly run on the said wheel 8. This guide bar has means whereby it may be readily secured to the saw blade 11 to the toothed edge thereof; and for this purpose, it is shown as provided at one end with a fixed clamp bar 23, a portion of which is slightly offset from the said bar 2 and is provided with a set screw 24 which will impinge against the saw blade, preferably in line with a depression 25 in the bar 22.

For clamping the other end of the saw blade, a clamping bar 26 is adjustably secured to the bar 22, shown by means of a short nutted bolt 27 adapted to be inserted through any one of a series of longitudinally spaced perforations 28 in the bar 22. A portion of the clamping bar 26 is slightly offset from the bar 22 and is provided with a set screw 29 adapted to engage the saw, in line with any one of several depressions 30 formed in the bar 22. The adjustable clamp 26 makes it possible to apply the guide bar to saw blades which vary a great deal in length.

When the guide bar is applied to the saw blade, as shown in Figs. 7 and 8, the saw setting device proper is applied for work by engaging the setting wheel or the saw teeth in a manner already described, and setting the lower edge of the guide bar 22 on the grooved face of the guide wheel 8. By adjustments of the lower block 7 and guide wheel 8, the tension under which the spring 12 will force the setting wheel against the saw teeth, may be varied at will, so that more or less "set" may be given to the saw teeth. By pressing the free end of the lever 14 downward, the upper block 10 and setting wheel 17 may be raised so as to permit ready application of the setting device to the saw and bar, or their ready removal therefrom.

When the device is to be used to set the teeth of the saw having a back that is parallel to its tooth edge, such, for example, as a butcher's saw, the setting wheel should be turned with its hub 21 outward, as shown in Fig. 5, and this will bring the channel of the setting wheel into the plane of a narrow peripheral groove 8$^a$ formed in the guide wheel 8, so that the back of such saw blade may then be caused to run directly in the said groove 8$^a$.

Fig. 6 illustrates the relative position of the saw teeth in respect to the concave tooth-engaging surface 20 of the setting wheel. It will be noted that these concave surfaces engage the inner edges of the laterally offset teeth. To illustrate this feature, that edge of a tooth which is pressed outward is indicated at $a$ and that edge which is on the inner side of the offset tooth is indicated at $a'$. The tooth point $a$ is, of course, that which cuts the groove and must always be left sharp, and the corresponding point of a tooth projected in the opposite direction cuts the other wall of the slot. The said outer or cutting edges of the teeth are therefore, not dulled by the tooth setting action of the setting wheel. In Fig. 6, the concave surfaces are sectioned below the points of the teeth so that the teeth may be shown, but it will, of course, be understood that the concave engagement will follow to the inner sides of the points of the saw teeth. When this is kept in mind, it will also be clear why the teeth, acting in these concave setting surfaces, positively rotate the setting wheel and keep the same in its proper relation to the saw teeth. Of course, it should be understood that setting wheels having setting surfaces corresponding to the teeth of the particular saw to be set, must be provided. That is, for a saw having ten teeth to the inch, the setting surfaces circumferentially measured at the operative portion of the setting wheel, must also be approximately ten to the inch.

What I claim is:

1. In a saw setting device, the combination with a guide wheel, of a coöperating setting wheel formed with two opposing series of circumferentially spaced tooth engaging surfaces that are in reverse conical arrangement staggered circumferentially, and means whereby said setting wheel may be set to work, either in the plane of or slightly offset from the plane of said guide wheel.

2. In a saw setting device, the combination with a guide wheel, of a coöperating setting wheel formed with two opposing series of circumferentially spaced tooth engaging surfaces that are in reverse conical arrangement staggered circumferentially, and means whereby said setting wheel may be set to work, either in the plane of, or slightly offset from, the plane of said guide wheel, the said guide wheel having relatively narrow and wide peripheral grooves, the former to engage the back of a saw, and the latter to engage a guide bar secured on one side of the saw.

3. In a saw setting device, the combination with a support, of a setting wheel journaled to said support and having two opposing series of circumferentially spaced tooth engaging surfaces in reverse conical arrangement staggered circumferentially, a coöperating guide wheel also journaled to said support, the said setting wheel having one hub of greater projection than the other so that when set with one hub outward, it will be in the plane of said guide wheel and when set with the other hub outward, it will be slightly offset from the plane of said guide wheel.

4. The combination with a guide bar having means for detachably securing the same to a saw blade parallel to the toothed edge thereof, of a saw setting device having a setting wheel and a coöperating guide wheel, the latter of which is arranged to run against said guide bar, while the former is operative on the teeth of said saw.

5. The combination with a guide bar having means for detachably securing the same to a saw blade parallel to the toothed edge thereof, of a saw setting device having a setting wheel and a coöperating guide wheel, the latter of which is arranged to run against said guide bar, while the former is operative on the teeth of said saw, and the said guide bar, at one end, having a longitudinally adjustable saw clamp adapting it to be attached to saws of different lengths.

In testimony whereof I affix my signature in presence of two witnesses.

HUGH B. FOLEY.

Witnesses:
F. D. MERCHANT,
CLARA DEMAREST.